US010952022B2

United States Patent
Schubert et al.

(10) Patent No.: US 10,952,022 B2
(45) Date of Patent: Mar. 16, 2021

(54) SYSTEMS AND METHODS FOR IDENTIFYING A CONTEXT OF AN ENDPOINT ACCESSING A PLURALITY OF MICROSERVICES

(71) Applicant: Citrix Systems, Inc., Fort Lauderdale, FL (US)

(72) Inventors: Ebenezer Schubert, Santa Clara, CA (US); Jeremy White, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 11 days.

(21) Appl. No.: 16/415,106

(22) Filed: May 17, 2019

(65) Prior Publication Data

US 2020/0366574 A1    Nov. 19, 2020

(51) Int. Cl.
| | |
|---|---|
| *H04W 4/024* | (2018.01) |
| *H04L 12/24* | (2006.01) |
| *H04L 29/08* | (2006.01) |
| *H04W 4/02* | (2018.01) |
| *H04W 4/48* | (2018.01) |
| *G06F 9/46* | (2006.01) |

(52) U.S. Cl.
CPC ............ *H04W 4/024* (2018.02); *G06F 9/465* (2013.01); *H04L 41/5032* (2013.01); *H04L 41/5051* (2013.01); *H04L 67/02* (2013.01); *H04L 67/30* (2013.01); *H04W 4/027* (2013.01); *H04W 4/48* (2018.02)

(58) Field of Classification Search
CPC ....... H04W 4/024; H04W 4/027; H04W 4/48; G06F 9/465; H04L 41/5051; H04L 41/5032; H04L 67/02
See application file for complete search history.

(56) References Cited

U.S. PATENT DOCUMENTS

| | | | |
|---|---|---|---|
| 2005/0246726 A1* | 11/2005 | Labrou | G06F 9/465 719/328 |
| 2008/0299954 A1* | 12/2008 | Wright | H04W 4/024 455/414.1 |
| 2017/0160880 A1 | 6/2017 | Jose et al. | |
| 2017/0220963 A1 | 8/2017 | Canaran | |
| 2017/0366623 A1 | 12/2017 | Shi et al. | |

OTHER PUBLICATIONS

Examination Report on EP Appl. No. 20172975.3, dated Oct. 1, 2020.

* cited by examiner

*Primary Examiner* — Kyung H Shin
(74) *Attorney, Agent, or Firm* — Foley & Lardner LLP

(57) ABSTRACT

Described embodiments provide systems and methods for identifying a context of an endpoint accessing a plurality of microservices is provided. A device intermediary to a plurality of endpoints and a plurality of microservices can receive a plurality of calls to one or more of the plurality of microservices originating from the plurality of endpoints. The device can identify a context for each of the endpoints. The context can include one of a type of device or a type of application. The device can identify, for each unique context, one or more microservices of the accessed by the plurality of endpoints having that unique context. A service graph can be generated to identify the one or more microservices of the plurality of microservices accessed by the plurality of endpoints having that at least one unique context.

20 Claims, 12 Drawing Sheets

SYSTEMS AND METHODS FOR IDENTIFYING A CONTEXT OF AN ENDPOINT ACCESSING A PLURALITY OF MICROSERVICES

BACKGROUND

Devices can include or use a plurality of software applications to perform a variety of different functions. The applications can be built a single, autonomous unit such that the applications are self-contained and independent from other applications executing on a device. However, to update the applications, changes can impact the entire application or device executing the respective application. For example, a modification to a small section of code can require building and deploying an entirely new version of software for the application.

SUMMARY

This Summary is provided to introduce a selection of concepts in a simplified form that are further described below in the Detailed Description. This Summary is not intended to identify key features or essential features, nor is it intended to limit the scope of the claims included herewith.

The present disclosure is directed towards systems and methods for identifying a context of an endpoint accessing a plurality of microservices. A device can be disposed between a plurality of microservices to route and monitor calls received from one or more endpoints and intended for one or more microservices. The device can track and determine call data from each of the plurality of calls to determine the respective endpoint that transmitted the call and an intended to selected microservice to receive the call. In embodiments, the device can identify a context for each of the endpoints transmitting calls. For example, the device can determine a type of device of the endpoint or a type of application of the endpoint. The device can determine which microservices that endpoints of the same context access or attempt to call based in part on the call data from the plurality of calls. The plurality of calls can be grouped or classified based in part on the context of the endpoints generating the respective calls. A service graph can be generated for each unique context identified for the endpoints generating the plurality of calls. In embodiments, the device can generate contextual service graphs based in part on the context of one or more endpoints generating one or more calls.

In at least one aspect, a method for identifying a context of an endpoint accessing a plurality of microservices is provided. The method can include receiving, by a device intermediary to a plurality of endpoints and a plurality of microservices, a plurality of calls to one or more of the plurality of microservices originating from the plurality of endpoints accessing the plurality of microservices. The method can include identifying, by the device based at least on the plurality of calls, a context for each of the endpoints of the plurality of endpoints. The context can include one of a type of device of the endpoint or a type of application of the endpoint communicating the call. The method can include identifying, by the device, for each unique context, one or more microservices of the plurality of microservices accessed by the plurality of endpoints having that unique context. The method can include generating, by the device based on at least one unique context, a service graph to identify the one or more microservices of the plurality of microservices accessed by the plurality of endpoints having that at least one unique context.

In some embodiments, the method can include forwarding, by the device, the plurality of calls to the one or more of the plurality of microservices. The method can include determining the context of an endpoint from data carried by a call originating from the endpoint. In embodiments, the method can include determining the context of an endpoint from one or more headers of a hypertext Transfer Protocol (HTTP) layer of a call originating from the endpoint.

The type of device can include one of a desktop device, a mobile device or an Internet of Things (IoT) device. The type of device can include one of type of operating system of the device or metadata about the device. The type of application can include one of a browser, a client application or a mobile application.

In embodiments, the method can include identifying one or more endpoints of the plurality of endpoints having a first context of a plurality of contexts and identifying the one or more microservices of the plurality of microservices accessed by the one or more endpoints having the first context. The method can include displaying, by the device, the service graph to identify the unique context and the one or more microservices called by the one or more endpoints having the unique context. The method can include generating, by the device, a plurality of services graphs for a plurality of unique contexts and displaying the plurality of graphs to identify one of differences or similarities in one or more microservices accessed by the plurality of endpoints.

In at least one aspect, a system for identifying a context of an endpoint accessing a plurality of microservices is provided. The system can include a device having one or more processors, coupled to memory and intermediary to a plurality of endpoints and a plurality of microservices. The device can be configured to receive a plurality of calls to one or more of the plurality of microservices originating from the plurality of endpoints accessing the plurality of microservices. The device can be configured to identify, based at least on the plurality of calls, a context for each of the endpoints of the plurality of endpoints. The context can include one of a type of device of the endpoint or a type of application of the endpoint communicating the call. The device can be configured to identify for each unique context one or more microservices of the plurality of microservices accessed by the plurality of endpoints having that unique context. The device can be configured to generate, based on at least one unique context, a service graph to identify the one or more microservices of the plurality of microservices accessed by the plurality of endpoints having that at least one unique context.

In embodiments, the device can be further configured to forward the plurality of calls to the one or more of the plurality of microservices. The device can be further configured to determine the context of an endpoint from data carried by a call originating from the endpoint. The device can be further configured to determine the context of an endpoint from one or more headers of a hypertext Transfer Protocol (HTTP) layer of a call originating from the endpoint.

In some embodiments, the type of device can include one of a desktop device, a mobile device or an Internet of Things (IoT) device. The type of device can include one of type of operating system of the device or metadata about the device. The type of application can include one of a browser, a client application or a mobile application.

In embodiments, the device can be further configured to identify one or more endpoints of the plurality of endpoints having a first context of a plurality of contexts and identifying the one or more microservices of the plurality of microservices accessed by the one or more endpoints having the first context. The device can be further configured to display the service graph to identify the unique context and the one or more microservices called by the one or more endpoints having the unique context. The device can be further configured to generate a plurality of services graphs for a plurality of unique contexts and displaying the plurality of graphs to identify one of differences or similarities in one or more microservices accessed by the plurality of endpoints.

BRIEF DESCRIPTION OF THE DRAWINGS

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 1A:
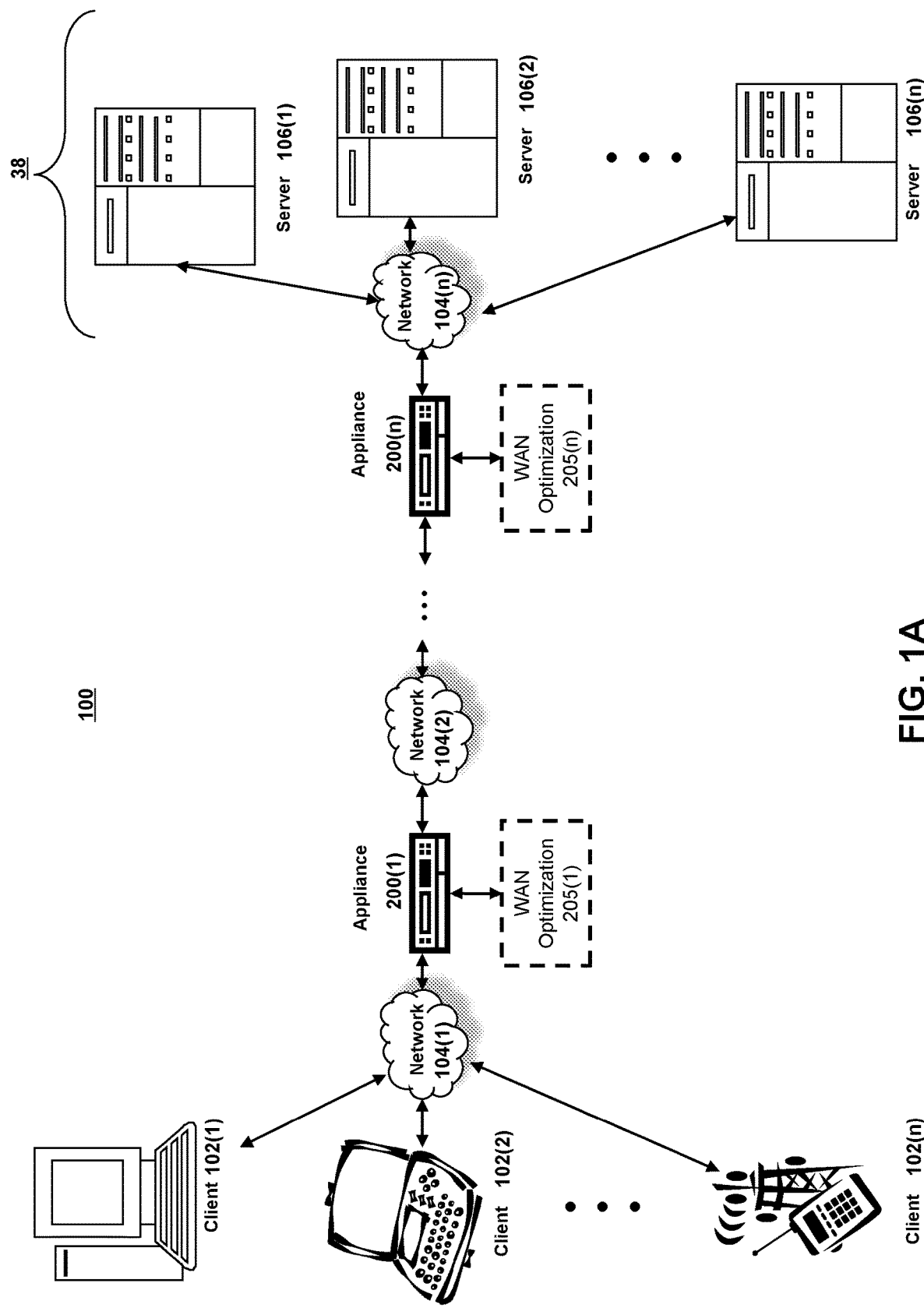
FIG. 1A is a block diagram of a network computing system, in accordance with an illustrative embodiment.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment;

Section E describes implementation of systems and methods for a service graph based platform and technology; and Section F describes embodiments of systems and methods for identifying a context of an endpoint accessing a plurality of microservices.

A. Network and Computing Environment

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, Fla.

Figure 1B:
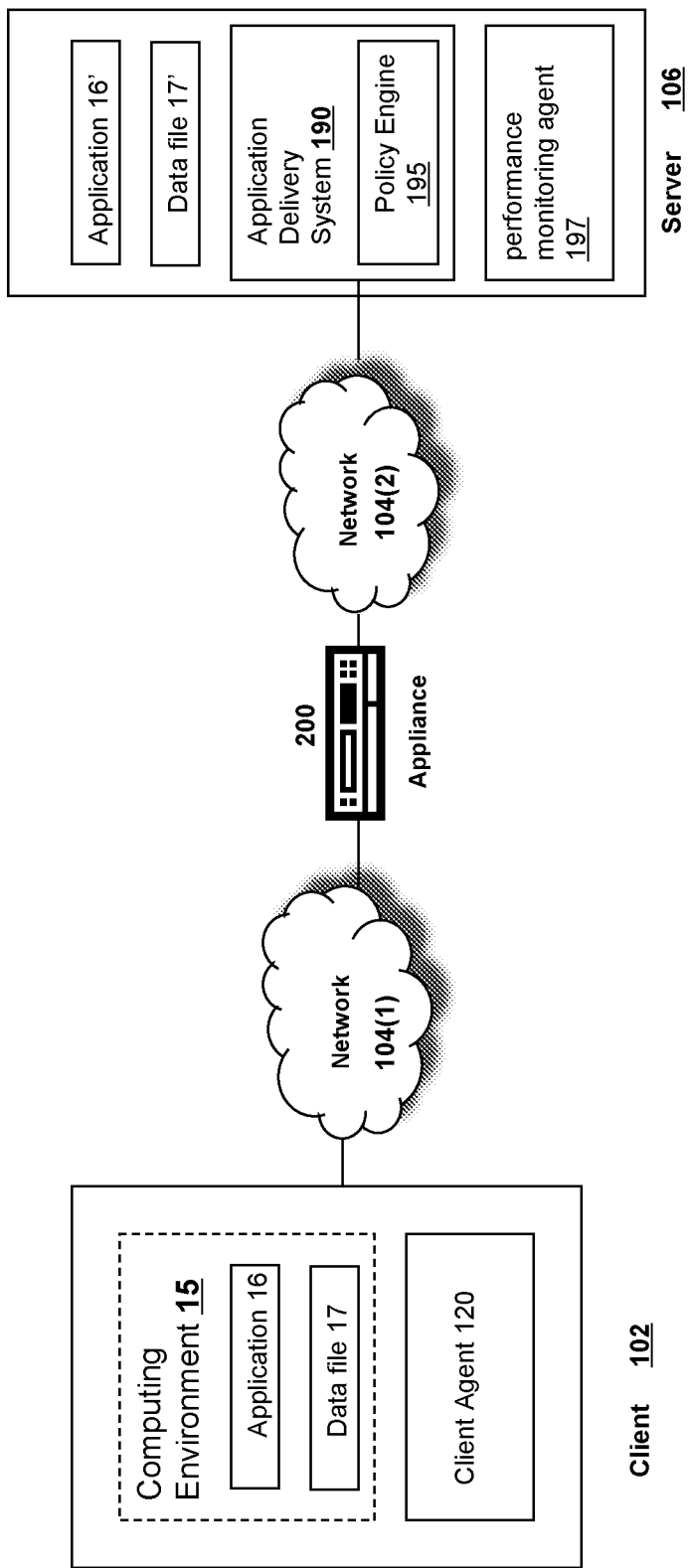
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include a client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
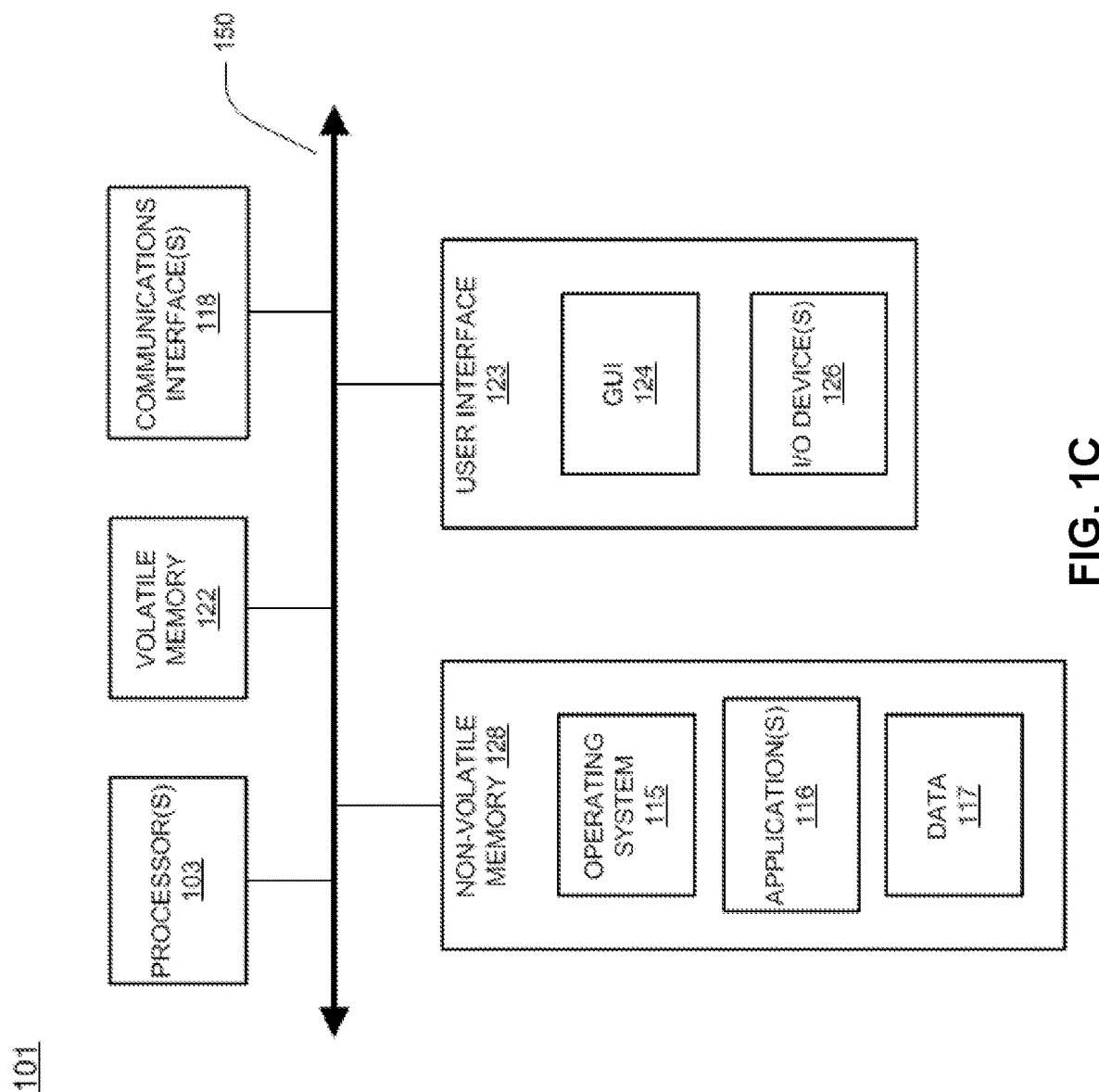
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
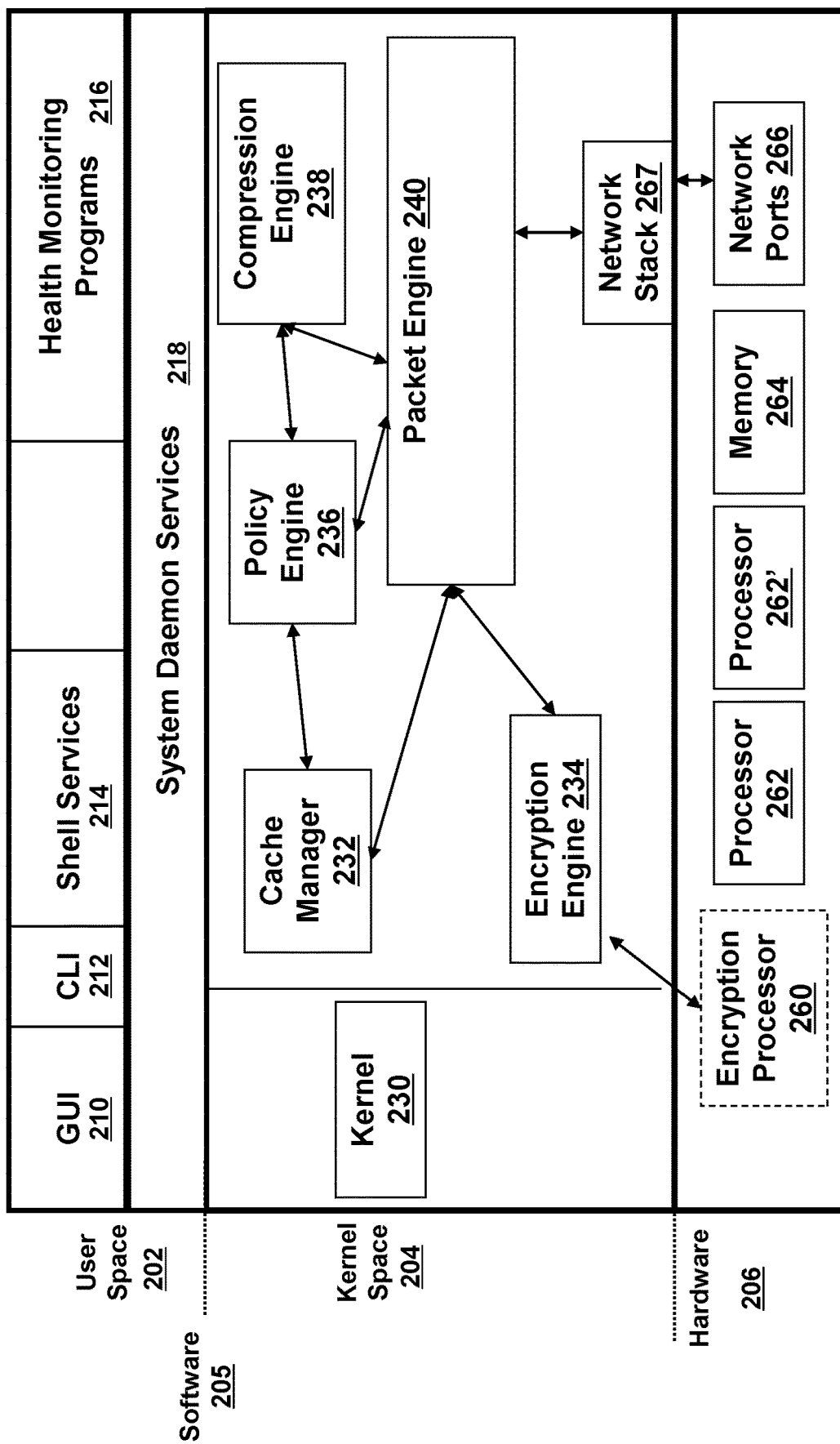
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a Citrix Hypervisor by Citrix Systems, Inc. of Fort Lauderdale, Fla. In an illustrative embodiment, device 302 executing a hypervisor that creates a virtual machine platform on which guest operating systems may execute is referred to as a host server 302.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
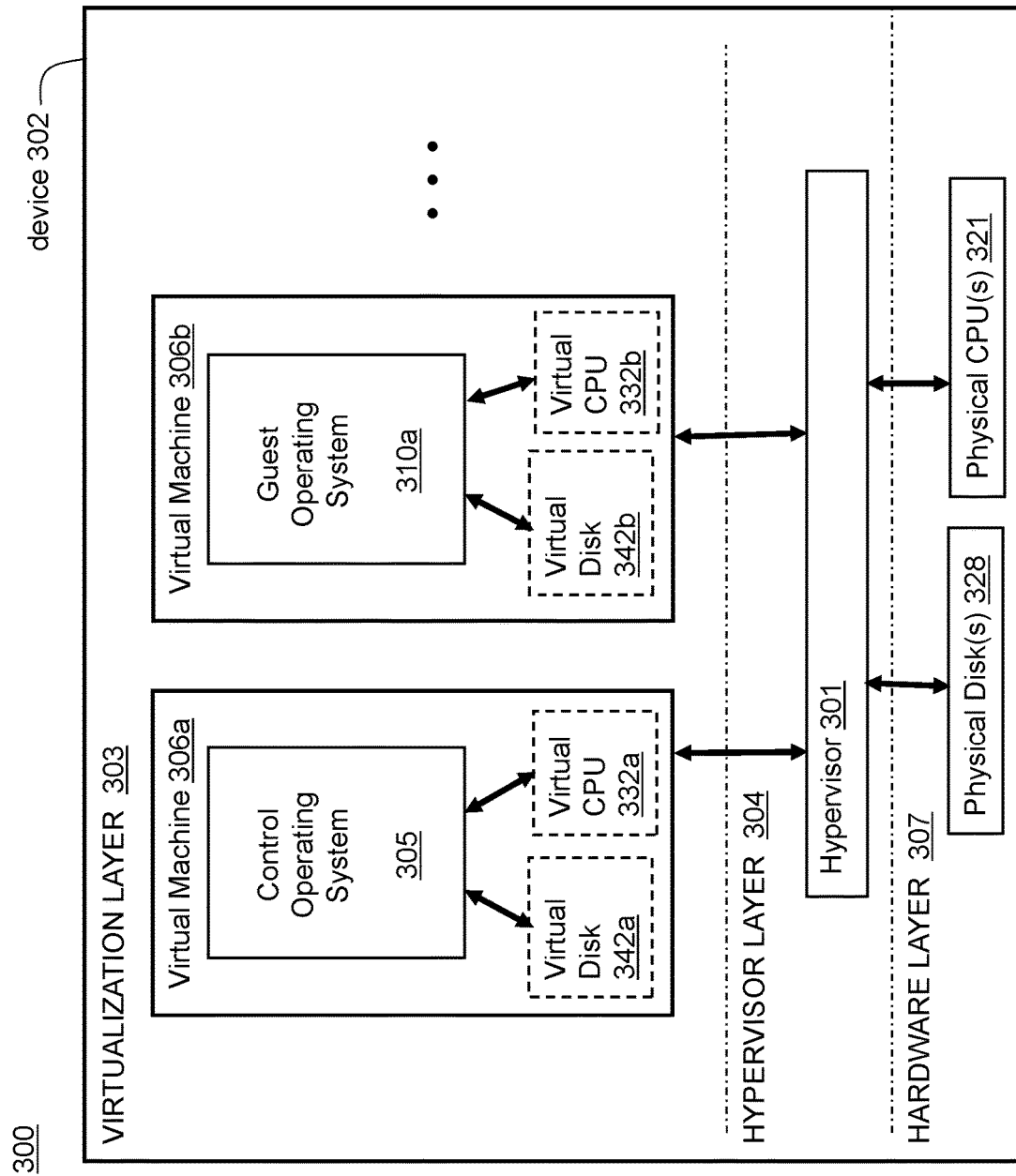
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

D. Systems and Methods for Providing a Distributed Cluster Architecture

Figure 4:
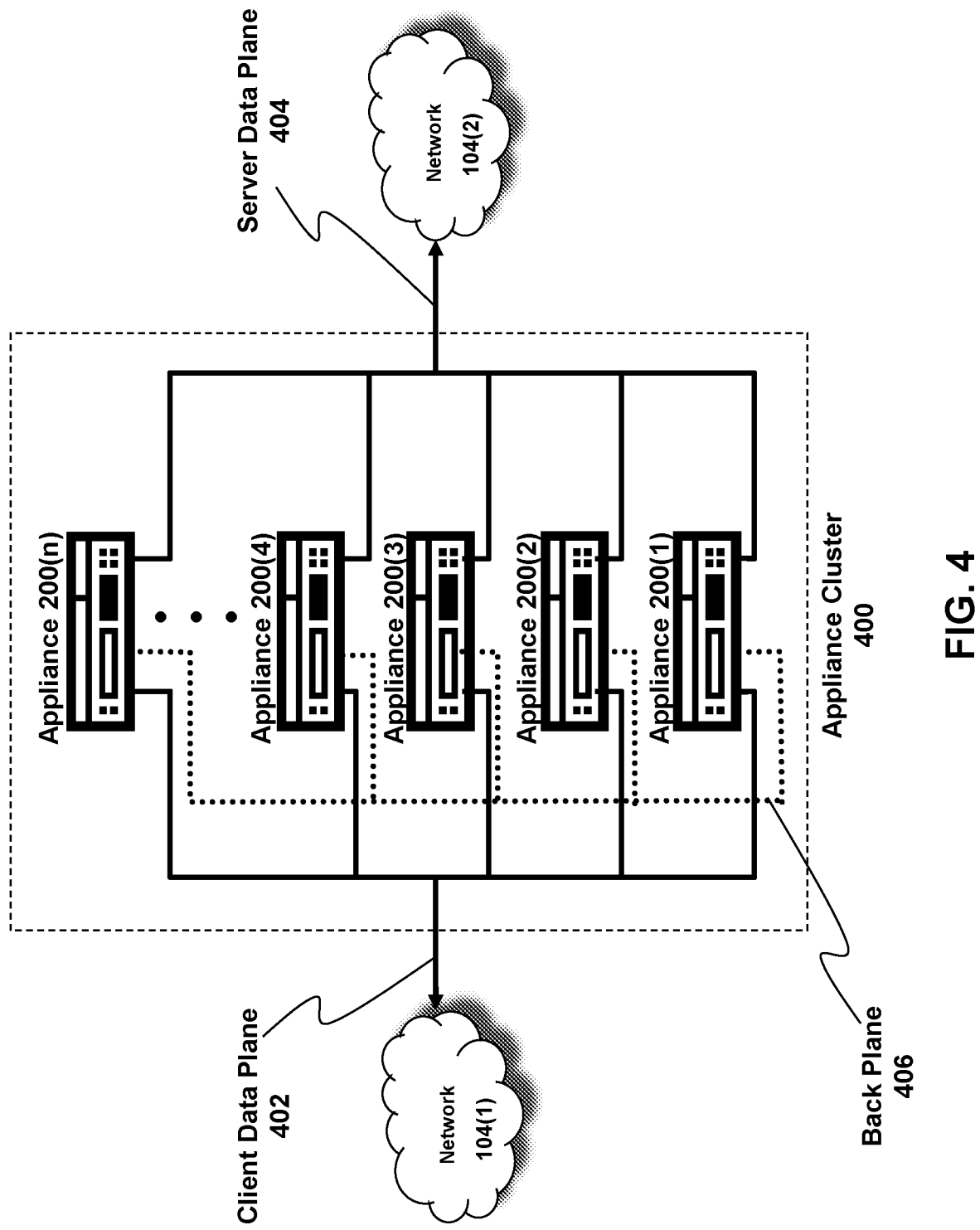
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

E. Service Graph Based Platform and Technology

Figure 5A:
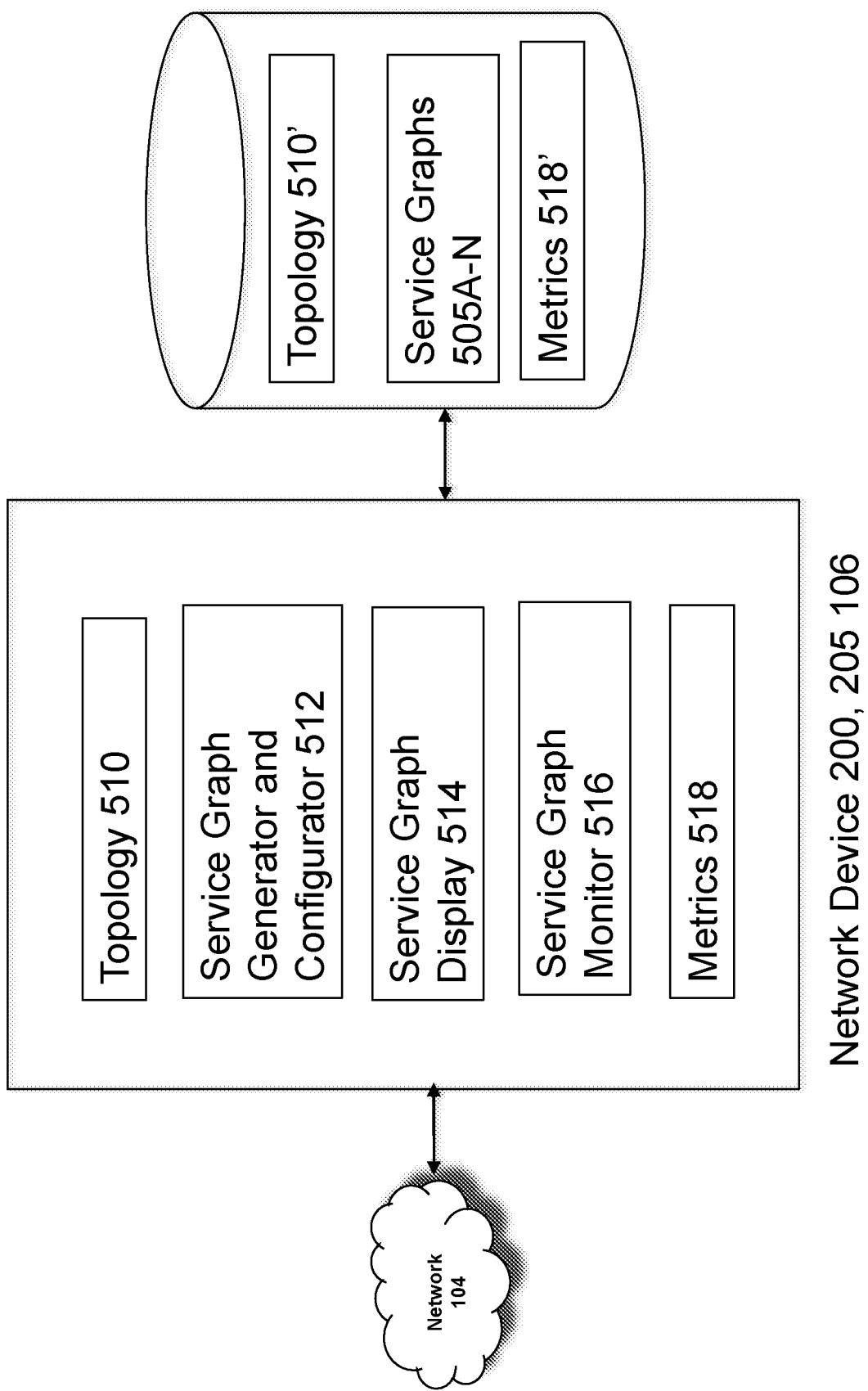
FIG. 5A is a block diagram of a service graph based system, in accordance with an illustrative embodiment.
Figure 5B:
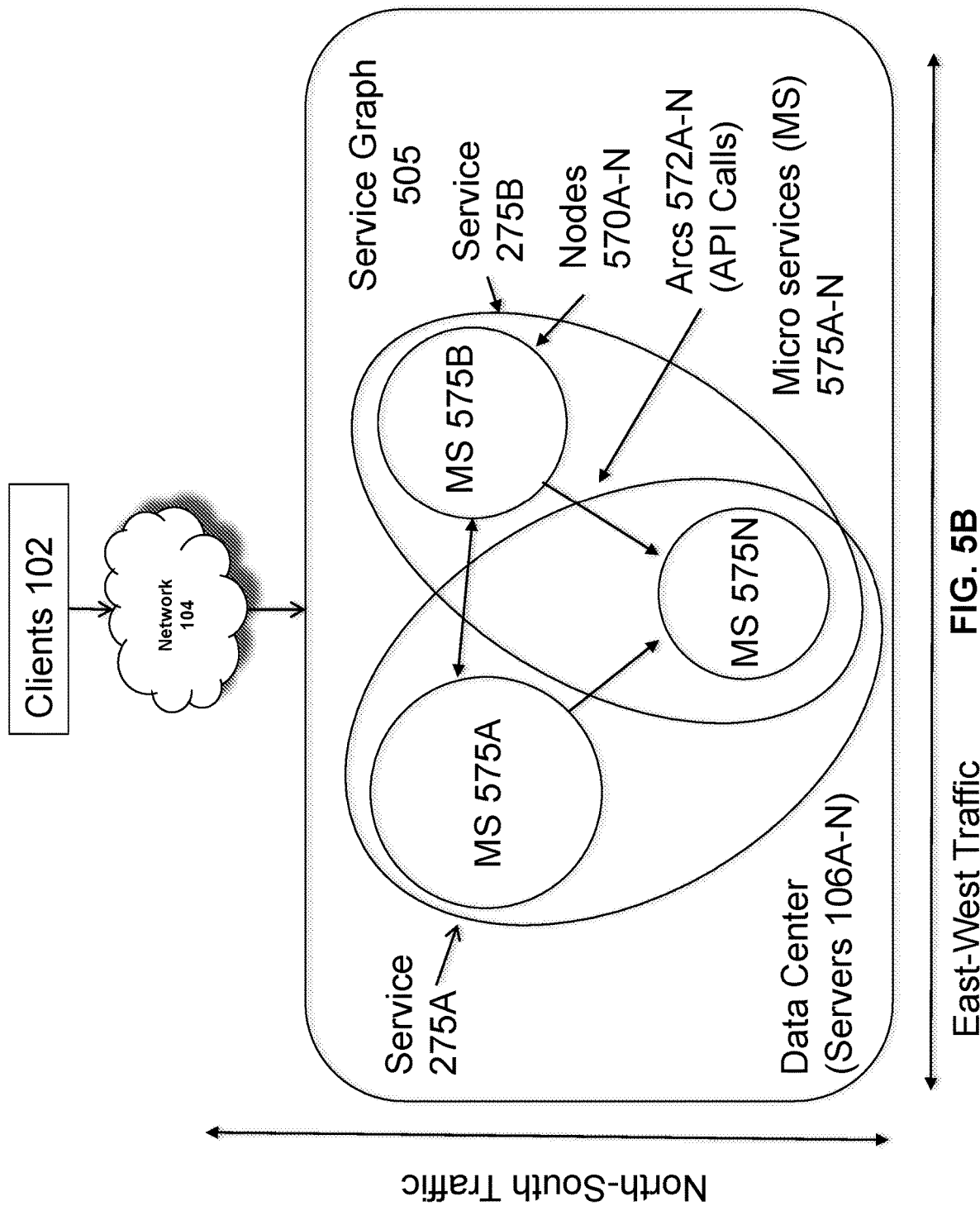
FIG. 5B is a block diagram of a service graph, in accordance with an illustrative embodiment.
Figure 5C:
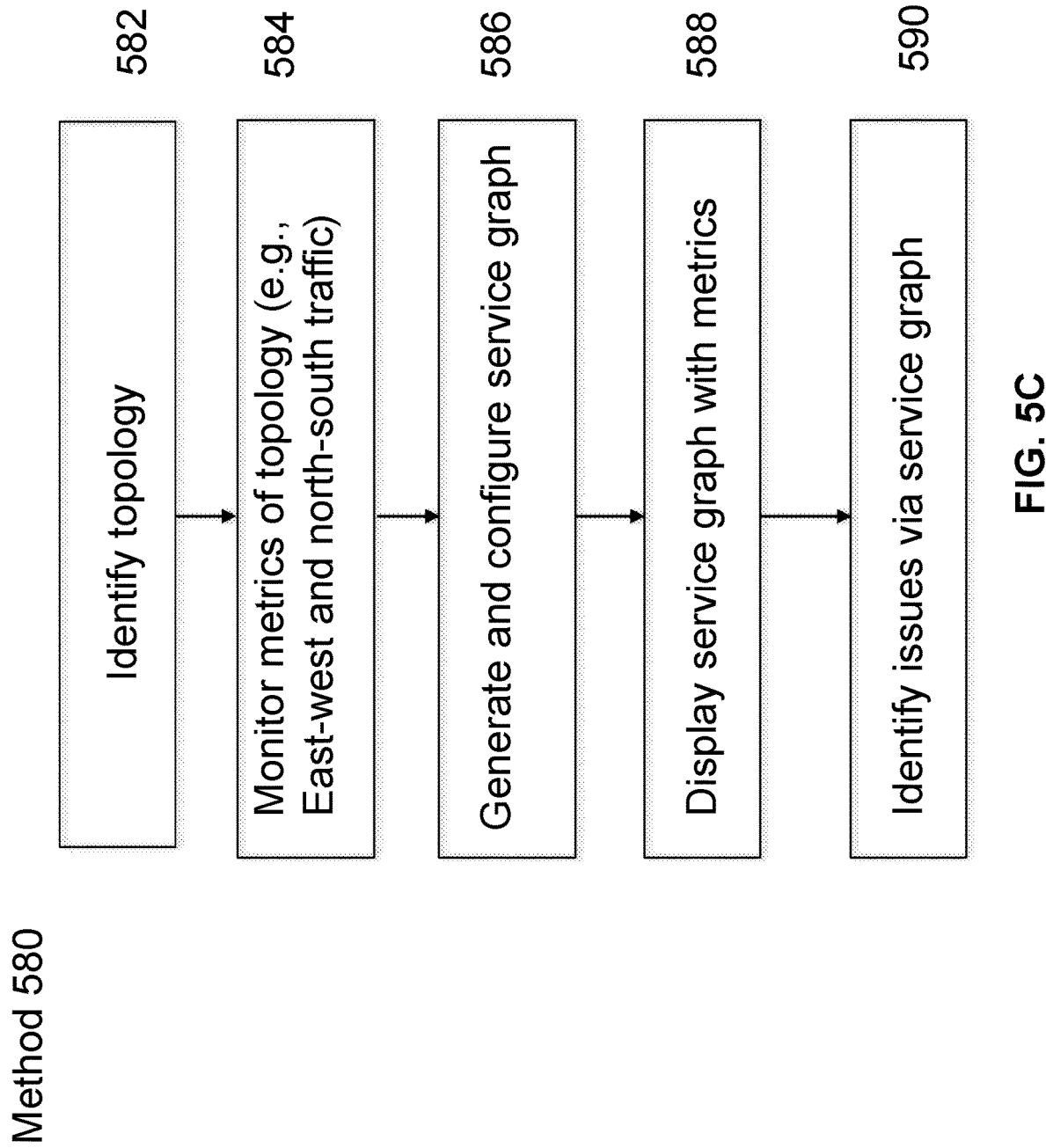
FIG. 5C is a flow diagram of a method of using a service graph, in accordance with an illustrative embodiment.

Referring now to FIGS. 5A-5C, implementation of systems and methods for a service graph based platform and technology will be discussed. A service graph is a useful technology tool for visualizing a service by its topology of components and network elements. Services may be made up of microservices with each microservice handling a particular set of one or more functions of the service. Network traffic may traverse the service topology such as a client communicating with a server to access service (e.g., north-south traffic). Network traffic of a service may include network traffic communicated between microservices of the services such as within a data center or between data centers (e.g., east-west traffic). The service graph may be used to identify and provide metrics of such network traffic of the service as well as operation and performance of any network elements used to provide the service. Service graphs may be used for identifying and determining issues with the service and which part of the topology causing the issue. Services graphs may be used to provide for administering, managing and configuring of services to improve operational performance of such services.

Referring to FIG. 5A, an implementation of a system for service graphs, such as those illustrated in FIG. 5B, will be described. A device on a network, such as a network device 200, 205 or a server 206, may include a service graph generator and configurator 512, a service graph display 514 and service graph monitor 516. The service graph generator and configurator 512 (generally referred to as service graph generator 512), may identify a topology 510 of elements in the network and metrics 518 related to the network and the elements, to generate and/or configure service graphs 505A-N. The service graphs 505A-N (generally referred to as service graphs 505) may be stored in one or more databases, with any of the metric 518' and/or topology 510'. The service graphic generator 512 may generate data of the service graphs 505 to be displayed in a display or rendered form such as via a user interface, generated referred to as service graph display 514. Service graph monitor 516 may monitor the network elements of the topology and service for metrics 518 to configure and generate a service graph 505 and/or to update dynamically or in real-time the elements and metrics 518 of or represented by a service graph display 514.

The topology 510 may include data identifying, describing, specifying or otherwise representing any elements used, traversed in accessing any one or more services or otherwise included with or part of such one or more services, such as any of the services 275 described herein. The topology may include data identifying or describing any one or more networks and network elements traversed to access or use the services, including any network devices, routers, switches, gateways, proxies, appliances, network connections or links, Internet Service Providers (ISPs), etc. The topology may include data identifying or describing any one or more applications, software, programs, services, processes, tasks or functions that are used or traversed in accessing a service. In some implementations, a service may be made up or include multiple microservices, each providing one or more functions, functionality or operations of or for a service. The topology may include data identifying or describing any one or more components of a service, such as programs, functions, applications or microservices used to provide the service. The topology may include parameters, configuration data and/or metadata about any portion of the topology, such as any element of the topology.

A service graph 505 may include data representing the topology of a service 275, such any elements making up such a service or used by the service, for example as illustrated in FIG. 5B. The service graph may be in a node base form, such as graphical form of nodes and each node representing an element or function of the topology of the service. A service graph may represent the topology of a service using nodes connected among each other via various connectors or links, which may be referred to as arcs. The arc may identify a relationship between elements connected by the arc. Nodes and arcs may be arranged in a manner to identify or describe one or more services. Nodes and arcs may be arranged in a manner to identify or describe functions provided by the one or more services. For example, a function node may represent a function that is applied to the traffic, such as a transform (SSL termination, VPN gateway), filter (firewalls), or terminal (intrusion detection systems). A function within the service graph might use one or more parameters and have one or more connectors.

The service graph may include any combination of nodes and arcs to represent a service, topology or portions thereof. Nodes and arcs may be arranged in a manner to identify or describe the physical and/or logical deployment of the service and any elements used to access the service. Nodes and arcs may be arranged in a manner to identify or describe the flow of network traffic in accessing or using a service. Nodes and arcs may be arranged in a manner to identify or describe the components of a service, such as multiple microservices that communicate with each other to provide functionality of the service. The service graph may be stored in storage such as a database in a manner in order for the service graph generator to generate a service graph in memory and/or render the service graph in display form 514.

The service graph generator 512 may include an application, program, library, script, service, process, task or any type and form of executable instructions for establishing, creating, generating, implementing, configuring or updating a service graph 505. The service graph generator may read and/or write data representing the service graph to a database, file or other type of storage. The service graph generator may comprise logic, functions and operations to construct the arrangement of nodes and arcs to have an electronic representation of the service graph in memory. The service graph generator may read or access the data in the database and store data into data structures and memory elements to provide or implement a node based representation of the service graph that can be updated or modified. The service graph generator may use any information from the topology to generate a service graph. The service graph generator may make network calls or use discovery protocols to identify the topology or any portions thereof. The service graph generator may use any metrics, such as in memory or storage or from other devices, to generate a service graph. The service graph generator may comprise logic, functions and operations to construct the arrangement of nodes and arcs to provide a graphical or visual representation of the service graph, such as on a user interface of a display device. The service graph generator may comprise logic, functions and operations to configure any node or arc of the service graph to represent a configuration or parameter of the corresponding or underlying element represented by the node or arc. The service graph generator may comprise logic, functions and operations to include, identify or provide metrics in connection with or as part of the arrangement of nodes and arcs of the service graph display. The service graph generator may comprise an application programming interface (API) for programs, applications, services, tasks, processes or systems to create, modify or interact with a service graph.

The service graph display 514 may include any graphical or electronic representation of a service graph 505 for rendering or display on any type and form of display device. The service graph display may be rendered in visual form to have any type of color, shape, size or other graphical indicators of the nodes and arcs of the service graph to represent a state or status of the respective elements. The service graph display may be rendered in visual form to have any type of color, shape, size or other graphical indicators of the nodes and arcs of the service graph to represent a state or status of one or more metrics. The service graph display may comprise any type of user interface, such as a dashboard, that provides the visual form of the service graph. The service graph display may include any type and form of user interface elements to allow users to interact, interface or manipulate a service graph. Portion of the service graph display may be selectable to identify information, such as metrics or topology information about that portion of the service graph. Portions of the service graph display may provide user interface elements for users to take an action with respect to the service graph or portion thereof, such as to modify a configuration or parameter of the element.

The service graph monitor 518 may include an application, program, library, script, service, process, task or any type and form of executable instructions to receive, identify, process metrics 518 of the topology 510. The service graph monitor 518 monitors via metrics 518 the configuration, performance and operation of elements of a service graph. The service graph monitor may obtain metrics from one or more devices on the network. The service graph monitor may identify or generate metrics from network traffic traversing the device(s) of the service graph monitor. The service graph monitor may receive reports of metrics from any of the elements of the topology, such as any elements represented by a node in the service graph. The service graph monitor may receive reports of metrics from the service. From the metrics, the service graph monitor may determine the state, status or condition of an element represented in or by the service graph, such as by a node of the service graph. From the metrics, the service graph monitor may determine the state, status or condition of network traffic or network connected represented in or by the service graph, such as by an arc of the service graph. The service graph generator and/or service graph monitor may update the service graph display, such as continuously or in predetermined frequencies or event based, with any metrics or any changed in the state, status or condition of a node or arc, element represented by the node or arc, the service, network or network traffic traversing the topology.

The metrics 518, 518' (generally referred to as metrics 518) may be stored on network device in FIG. 5B, such as in memory or storage. The metrics 518, 518' may be stored in a database on the same device or over a network to another device, such as a server. Metrics may include any type and form of measurement of any element of the topology, service or network. Metrics may include metrics on volume, rate or timing of requests or responses received, transmitted or traversing the network element represented by the node or arc. A Metrics may include metrics on usage of a resource by the element represented by the node or arc, such as memory, bandwidth. Metrics may include metrics on performance and operation of a service, including any components or microservices of the service, such as rate of response, transaction responses and times.

FIG. 5B illustrates an implementation of a service graph in connection with micro-services of a service in view of east-west network traffic and north-south network traffic. In brief overview, clients 102 may access via one or more networks 104 a data center having servers 106A-106N (generally referred to as servers 106) providing one or more services 275A-275N (generally referred to as services 275). The services may be made up multiple microservices 575A-575N (generally referred to as microservice or micro service 575). Service 275A may include microservice 575A and 575N while service 275B may include microservice 575B and 575N. The microservices may communicate among the microservices via application programming interface (APIs). A service graph 505 may represent a topology of the services and metrics on network traffic, such as east-west network traffic and north-south network traffic.

North-south network traffic generally describes and is related to network traffic between clients and servers, such as client via networks 104 to servers of data center and/or servers to clients via network 104 as shown in FIG. 5B. East-west network traffic generally describes and is related to network traffic between elements in the data centers, such as data center to data center, server to server, service to service or microservice to microservice.

A service 275 may comprise microservices 575. In some aspects, microservices is a form of service-oriented architecture style wherein applications are built as a collection of different smaller services rather than one whole or singular application (referred to sometimes as a monolithic application). Instead of a monolithic application, a service has several independent applications or services (e.g., microservices) that can run on their own and may be created using different coding or programming languages. As such, a larger server can be made up of simpler and independent programs or services that are executable by themselves. These smaller programs or services are grouped together to deliver the functionalities of the larger service. In some aspects, a microservices based service structures an application as a collection of services that may be loosely coupled. The benefit of decomposing a service into different smaller services is that it improves modularity. This makes the application or service easier to understand, develop, test, and be resilient to changes in architecture or deployment.

A microservice includes an implementation of one or more functions or functionality. A microservice may be a self-contained piece of business function(s) with clear or established interfaces, such as an application programming interface (API). In some implementations, a microservice may be deployed in a virtual machine or a container. A service may use one or more functions on one microservice and another one or more functions of a different microservice. In operating or executing a service, one microservice may make API calls to another microservice and the microservice may provide a response via an API call, event handler or other interface mechanism. In operating or executing a microservice, the microservice may make an API call to another microservice, which in its operation or execution, makes a call to another microservice, and so on.

The service graph 505 may include multiple nodes 570A-N connected or linked via one or more or arcs 572A-572N. The service graph may have different types of nodes. A node type may be used to represent a physical network element, such as a server, client, appliance or network device. A node type may be used to represent an end point, such as a client or server. A node type may be used to represent an end point group, such as group of clients or servers. A node type may be used to represent a logical network element, such as a type of technology, software or service or a grouping or sub-grouping of elements. A node type may be used to represent a functional element, such as functionality to be provided by an element of the topology or by the service.

The configuration and/or representation of any of the nodes 570 may identify a state, a status and/or metric(s) of the element represented by the node. Graphical features of the node may identify or specify an operational or performance characteristic of the element represented by the node. A size, color or shape of the node may identify an operational state of whether the element is operational or active. A size, color or shape of the node may identify an error condition or issue with an element. A size, color or shape of the node may identify a level of volume of network traffic, a volume of request or responses received, transmitted or traversing the network element represented by the node. A size, color or shape of the node may identify a level of usage of a resource by the element represented by the node, such as memory, bandwidth, CPU or storage. A size, color or shape of the node may identify relativeness with respect to a threshold for any metric associated with the node or the element represented by the node.

The configuration and/or representation of any of the arcs 572 may identify a state, status and/or metric(s) of the element represented by the arc. Graphical features of the arc may identify or specify an operational or performance characteristic of the element represented by the arc. A size, color or shape of the node may identify an operational state of whether the network connection represented by the arc is operational or active. A size, color or shape of the arc may identify an error condition or issue with a connection associated with the arc. A size, color or shape of the arc may identify an error condition or issue with network traffic associated with the arc. A size, color or shape of the arc may identify a level of volume of network traffic, a volume of request or responses received, transmitted or traversing the network connection or link represented by the arc. A size, color or shape of the arc may identify a level of usage of a resource by network connection or traffic represented by the arc, such as bandwidth. A size, color or shape of the node may identify relativeness with respect to a threshold for any metric associated with the arc. In some implementations, a metric for the arc may include any measurement of traffic volume per arc, latency per arc or error rate per arc.

Referring now to FIG. 5C, an implementation of a method for generating and displaying a service graph will be described. In brief overview of method 580, at step 582, a topology is identified, such as for a configuration of one or more services. At step 584, the metrics of elements of the topology, such as for a service are monitored. At step 586, a service graph is generated and configured. At step 588, a service graph is displayed. At step 590, issues with configuration, operation and performance of a service or the topology may be identified or determined.

At step 582, a device identifies a topology for one or more services. The device may obtain, access or receive the topology 510 from storage, such as a database. The device may be configured with a topology for a service, such as by a user. The device may discover the topology or portions therefore via one more discovery protocols communicated over the network. The device may obtain or receive the topology or portions thereof from one or more other devices via the network. The device may identify the network elements making up one or more services. The device may identify functions providing the one or more services. The device may identify other devices or network elements providing the functions. The device may identify the network elements for north-west traffic. The device may identify the network elements for east-west traffic. The device may identify the microservices providing a service. In some implementations, the service graph generator establishes or generates a service graph based on the topology. The service graph may be stored to memory or storage.

At step 584, the metrics of elements of the topology, such as for a service are monitored. The device may receive metrics about the one or more network elements of the topology from other devices. The device may determine metrics from network traffic traversing the device. The device may receive metrics from network elements of the topology, such as via reports or events. The device may monitor the service to obtain or receive metrics about the service. The metrics may be stored in memory or storage, such as in association with a corresponding service graph. The device may associate one or more of the metrics with a corresponding node of a service graph. The device may associate one or more of the metrics with a corresponding arc of a service graph. The device may monitor and/or obtain and/or receive metrics on a scheduled or predetermined frequency. The device may monitor and/or obtain and/or receive metrics on a continuous basis, such as in real-time or dynamically when metrics change.

At step 586, a service graph is generated and configured. A service graph generator may generate a service graph based at least on the topology. A service graph generator may generate a service graph based at least on a service. A service graph generator may generate a service graph based on multiple services. A service graph generator may generate a service graph based at least on the microservices making up a service. A service graph generator may generate a service graph based on a data center, servers of the data center and/or services of the data center. A service graph generator may generate a service graph based at least on east-west traffic and corresponding network elements. A service graph generator may generate a service graph based at least on north-south traffic and corresponding network elements. A service graph generator may configure the service graph with parameters, configuration data or metadata about the elements represented by a node or arc of the service graph. The service graph may be generated automatically by the device. The service graph may be generated responsive to a request by a user, such as via a comment to or user interface of the device.

At step 588, a service graph is displayed. The device, such as via service graph generator, may create a service graph display 514 to be displayed or rendered via a display device, such as presented on a user interface. The service graph display may include visual indicators or graphical characteristics (e.g., size, shape or color) of the nodes and arcs of the service graph to identify status, state or condition of elements associated with or corresponding to a node or arc. The service graph display may be displayed or presented via a dashboard or other user interface in which a user may monitor the status of the service and topology. The service graph display may be updated to show changes in metrics or the status, state and/or condition of the service, the topology or any elements thereof. Via the service graph display, a user may interface or interact with the service graph to discover information, data and details about any of the network elements, such as the metrics of a microservice of a service.

At step 590, issues with configuration, operation and performance of a service or the topology may be identified or determined. The device may determine issues with the configuration, operation or performance of a service by comparing metrics of the service to thresholds. The device may determine issues with the configuration, operation or performance of a service by comparing metrics of the service to previous or historical values. The device may determine issues with the configuration, operation or performance of a service by identifying a change in a metric. The device may determine issues with the configuration, operation or performance of a service by identifying a change in a status, state or condition of a node or arc or elements represented by the node or arc. The device may change the configuration and/or parameters of the service graph. The device may change the configuration of the service. The device may change the configuration of the topology. The device may change the configuration of network elements making up the topology or the service. A user may determine issues with the configuration, operation or performance of a service by reviewing, exploring or interacting with the service graph display and any metrics. The user may change the configuration and/or parameters of the service graph. The user may change the configuration of the service. The user may change the configuration of the topology. The device may change the configuration of network elements making up the topology or the service.

F. Identifying a Context of an Endpoint Accessing a Plurality of Microservices

The present disclosure is directed towards systems and methods for identifying a context of an endpoint accessing a plurality of microservices. A device can be disposed between a plurality of microservices to route and monitor calls received from one or more endpoints and intended for one or more microservices. The device can generate service graphs of calls based on context of one or more clients or one or more endpoints transmitting the calls. For example, the device can group or classify calls (e.g., microservice calls) for one or more different contexts based on the particular context of the microservice generating the call. In embodiments, calls from endpoints of different contexts (e.g., mobile device, desktop device) can be different. The devices as described herein can classify calls based in part on a context of an endpoint that generated the original or initial call. Thus, the device can distinguish similar and unique calls that are made based in part on a type of context of the endpoint. For example, in one embodiment, the device can distinguish similar and unique calls that are made based whether the endpoint is a web browser, a client application, or a mobile device.

The service calls generated by different types of clients can be different. For example, different types of clients can typically attempt to access or call different microservices. However, it can be difficult to determine call pattern or intended microservices when an initial or original is received. In embodiments, described herein service graphs can be determined and generated based in part on a context of the client device or endpoint generating one or more calls 642 associated with the service graph. A device can receive a plurality of calls and classify the calls based in part on a context of the one or more endpoints generating the respective calls. Thus, the service graphs can correspond to a plurality of end points having the same context or unique context. The device can use the service graph to identify patterns in the calls 342 generated by endpoints of different types of contexts.

Figure 6:
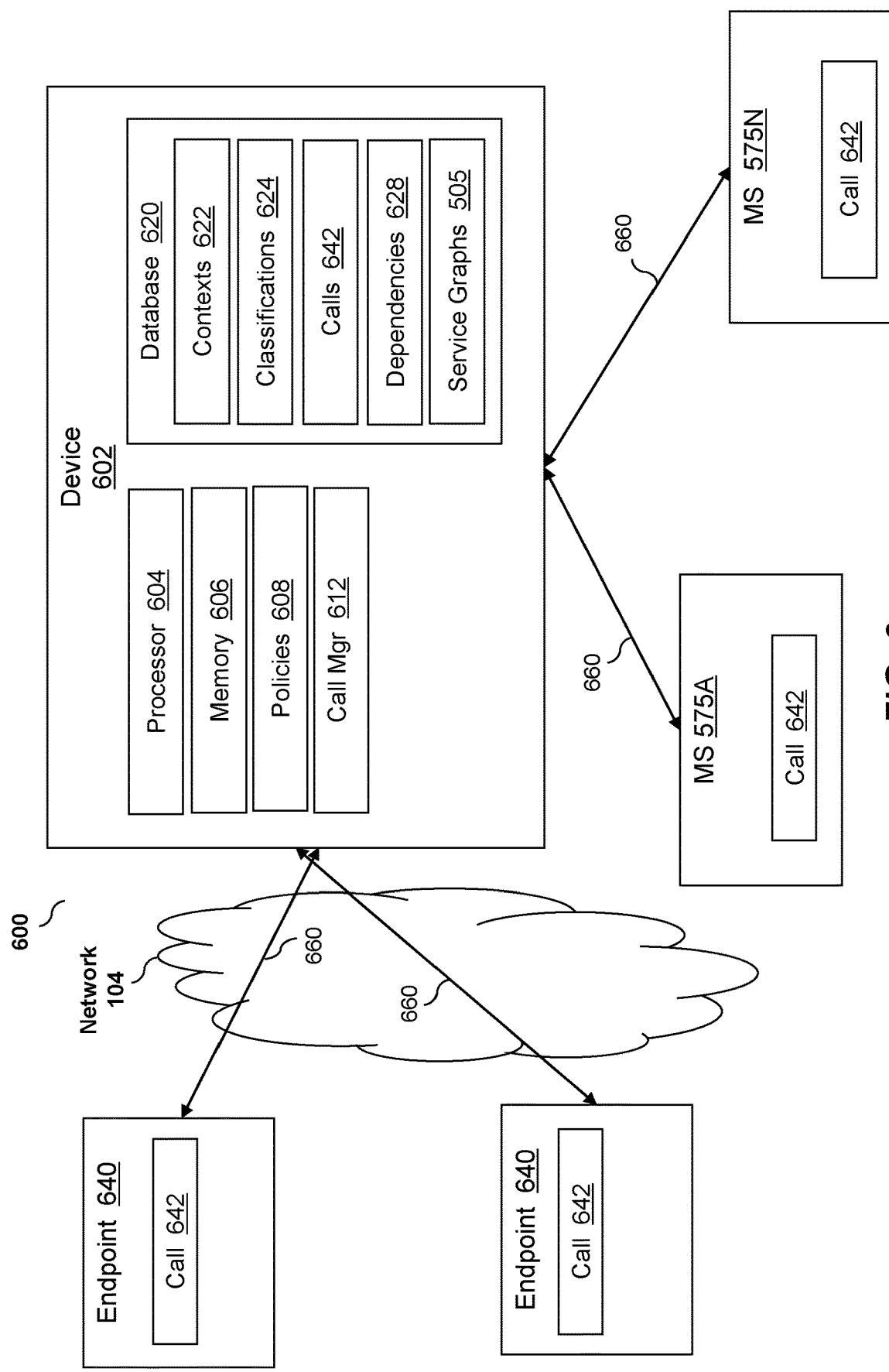
FIG. 6 is a block diagram of a system for identifying a context of an endpoint accessing a plurality of microservices.

Referring now to FIG. 6, depicted is a block diagram of a system 600 for identifying a context 622 of an endpoint 640 accessing a plurality of microservices 575. The device 602 can include an intermediary device, intermediary to a plurality of microservices 575 and/or a plurality of client devices (e.g., clients 102 of FIGS. 1A-1C and 5B). For example, the device 602 can include a proxy or a gateway to monitor calls and traffic, and route calls and traffic between a plurality of microservices 575 and a plurality of endpoints 640. In embodiments, the device 602 can include a server. The device 602 can include one or more processors 604 coupled to a memory 606. The processor 604 can include or be coupled to a non-volatile memory 606 that stores computer instructions and an operating system. For example, the computer instructions can be executed by the processor 604 out of volatile memory 606 to perform all or part of the methods 580 and 700. The device 602 can include or execute policies 608 or rules to identify a context 622 of one or more endpoints 640. The context 622 can include or correspond to properties of the respective endpoint 640 or an application or program executing on the respective endpoint 640. The context 622 can include or correspond to a type of endpoint 640. For example, the context 622 can include a client device, a computing device or a mobile device. In embodiments, a context 622 can include a browser (e.g., web browser), client application, a desktop device, a mobile device, and/or an Internet of Things (IoT) device. In embodiments, the context 622 can include a type of operating system of an endpoint 640. The device 602 can monitor traffic between a plurality of microservices 575 and a plurality of endpoints 640 to determine a context 622 of the endpoints 640 and generate one or more service graphs 505 based in part on the context 622 of the endpoints 640. In embodiments, the policies 608 can include rules for identifying for one or more contexts 622, one or more microservices 575 accessed by one or more endpoints having the respective context 622. The policies 608 can include rules for classifying a plurality of calls based in part on context 622. The policies 608 can include rules for generating one or more service graphs 505. In some embodiments, the policies 608 can include instructions for balancing load, bandwidth data, usage data and/or traffic routing data within a network 104.

The device 602 can be implemented using hardware or a combination of software and hardware. For example, each component of the device 602 can include logical circuitry (e.g., a central processing unit or CPU) that responses to and processes instructions fetched from a memory unit (e.g., memory 606). Each component of the device 602 can include or use a microprocessor or a multi-core processor. A multi-core processor can include two or more processing units on a single computing component. Each component of the device 602 can be based on any of these processors, or any other processor capable of operating as described herein. Each processor can utilize instruction level parallelism, thread level parallelism, different levels of cache, etc. For example, the device 602 can include at least one logic device such as a computing device or server having at least one processor to communicate via a network 104. The components and elements of the device 602 can be separate components or a single component. For example, the device 602 can include combinations of hardware and software, such as one or more processors configured to initiate stop commands, initiate motion commands, and transmit or receive event data, for example. The device 602 can include a structured set of data. For example, the device 602 can include and/or store data corresponding to one or more calls 642, context data, dependency data, and/or service graph data.

The device 602 can include a memory component (e.g., memory 606) to store and retrieve data. The memory 606 can include a random access memory (RAM) or other dynamic storage device, coupled with the device 602 for storing information, and instructions to be executed by the device 602. The memory 606 can include at least one read only memory (ROM) or other static storage device coupled with the device 602 for storing static information and instructions for the server 1102. The memory 606 can include a storage device, such as a solid state device, magnetic disk or optical disk, coupled with the device 602 to persistently store information and instructions.

The device 602 can include a call manager 612 to manage a plurality of calls 642 between one or more microservices 575 and/or one or more endpoints 640. The call manager 612 can be implemented using hardware or a combination of software and hardware. For example, the call manager 612 can include logical circuitry (e.g., a central processing unit or CPU) that responses to and processes instructions fetched from a memory unit (e.g., memory 606). The call manager 612 can include or use a microprocessor or a multi-core processor. A multi-core processor can include two or more processing units on a single computing component. The call manager 612 can include or can be based on any of these processors, or any other processor capable of operating as described herein. Each processor can utilize instruction level parallelism, thread level parallelism, different levels of cache, etc. For example, the call manager 612 can include at least one logic device such as a computing device or server having at least one processor to communicate via a network 104. The components and elements of the call manager 612 can be separate components or a single component. For example, the call manager 612 can include combinations of hardware and software.

In embodiments, the device 602 can generate and/or maintain one or more service graphs 505. The service graph 505 can be the same as or substantially similar to the service graphs 505 described above with respect to FIGS. 5A-5C. In embodiments, the device 602 can generate the service graph 505 to include data representing the topology of one or more calls 642 from one or more endpoints 640 to access one or more microservices 575. In embodiments, the service graph 505 can illustrate or show the dependencies 628 of the plurality of microservices 575 associated with the respective calls 642.

The device 602 can include a database 620. The database 620 can include a structured set of data (e.g., event data stored for the device 602). For example, the database 620 can include one or more calls 642 and call data. The database 620 can include one or more classifications 624. The classifications 624 can include groupings of calls 642 based in part on a context 622. The classifications 624 can include groupings of calls 642 grouped together based in part on a context 622. The classifications 624 can include groupings of endpoints 640 grouped together based in part on a context 622 of the respective endpoints 640. The classifications 624 can include groupings of microservices 575 grouped together based in part on a context 622 an at least one endpoint 640 accessing the respective microservices 575.

The database 620 can include a plurality of dependencies 628. A dependency 628, can include, but not limited to, a relationship between at least two microservices 575. For example, a dependency 628 can correspond to an order in which one or more microservices 575 work together, are grouped together or collectively respond to one or more calls 642. The dependency 628 can include a reliance of at least one microservice 575 to use the functionality, skill or services of at least one other microservice 575 to handle or execute a call 642 or multiple calls 642.

The device 602 can include a proxy or gateway to proxy, provide or otherwise transfer calls from one or more endpoints 640 to a plurality of microservices 575. In embodiments, the plurality of microservices 575 can be a component of one or more services 275. For example, the microservices 575 can be the same as or substantially similar to microservices 575A-575N described above with respect to FIGS. 5A-5C. For example, two or more microservices 575 can be grouped together or interact with each other to provide the functionality or skills of at least one service 275. The microservices 575 can communicate with one or more other microservices 575 via application programming interface (APIs). In some embodiments, the microservices 575 can couple with or receive calls 642 from the device 602 via one or more channels 660. The channels 660 can include a session or connection between the device 602 and at least one microservice 575. In some embodiments, the channels 660 can include a session or connection between two or more microservices 575. The channel 660 may include encrypted and/or secure sessions established between the device 602 and at least one microservice 575 or between two or more microservices 575. The encrypted session can include an encrypted connection between a device 602 and at least one microservice 575 or between two or more microservices 575.

The endpoints 640 can include a client device, such as, but not limited to a computing device or a mobile device. For example, the devices 1140 can be the same as or substantially similar to clients 102(1)-102(n) of FIG. 1A, client 102 of FIG. 1B, computer 101 of FIG. 1C and/or clients 102 of FIG. 5B. Thus, the endpoints 640 can include or correspond to an instance of any client device, mobile device or computer device described herein. The endpoints 640 can include, but not limited to, a browser (e.g., web browser), client application, a desktop device, a mobile device, and/or an Internet of Things (IoT) device. The endpoints 640 can couple with the device 602 through network 104 to access one or more microservices 575. In some embodiments, the endpoints 640 can couple transmit or forward calls 642 to the device 602 via one or more channels 660. The channels 660 can include a session or connection between the device 602 and at least one endpoint 640. The channel 660 may include encrypted and/or secure sessions established between the device 602 and at least one endpoint 640. The encrypted session can include an encrypted connection between a device 602 and at least one endpoint 640.

Network 104 may be a public network, such as a wide area network (WAN) or the Internet. In some embodiments, network 104 may be a private network such as a local area network (LAN) or a company Intranet. Network 104 may be the same as or substantially similar to network 104 described above with respect to FIGS. 1A-1B, 4, and 5A-5B.

Each of the above-mentioned elements or entities is implemented in hardware, or a combination of hardware and software, in one or more embodiments. Each component of the device 602 may be implemented using hardware or a combination of hardware or software detailed above in connection with FIGS. 1-5B. For instance, each of these elements or entities can include any application, program, library, script, task, service, process or any type and form of executable instructions executing on hardware of a client device (e.g., device 602). The hardware includes circuitry such as one or more processors in one or more embodiments.

Figure 7A:
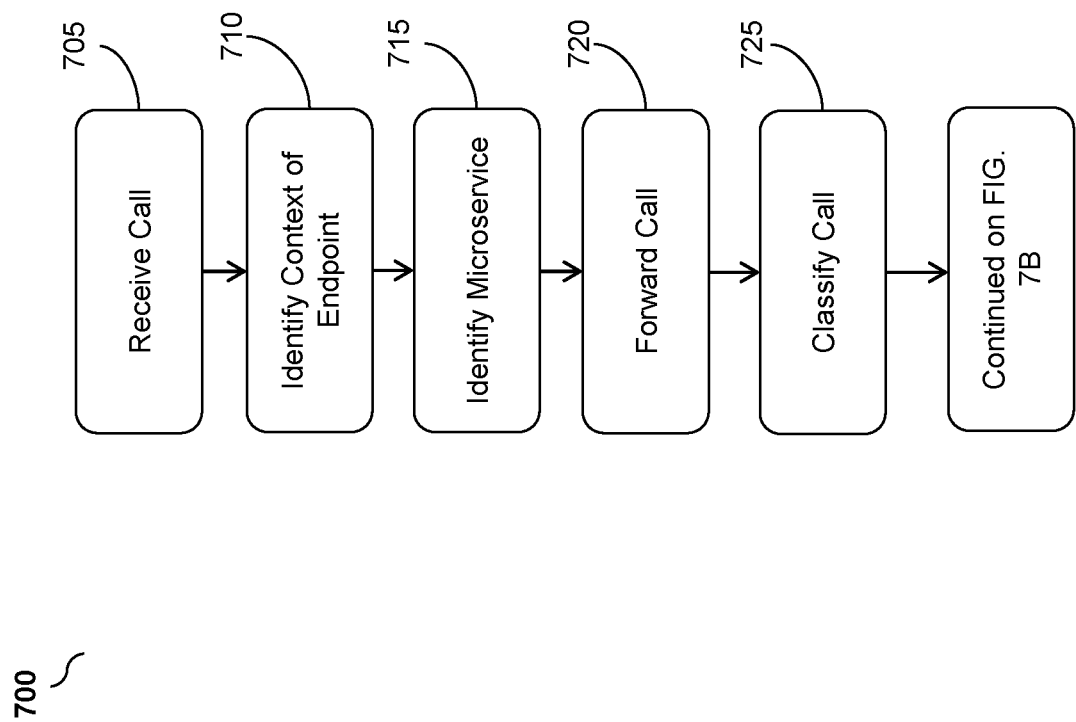
FIGS. 7A-7B are a flow diagram of a method for identifying a context of an endpoint accessing a plurality of microservices.
Figure 7B:
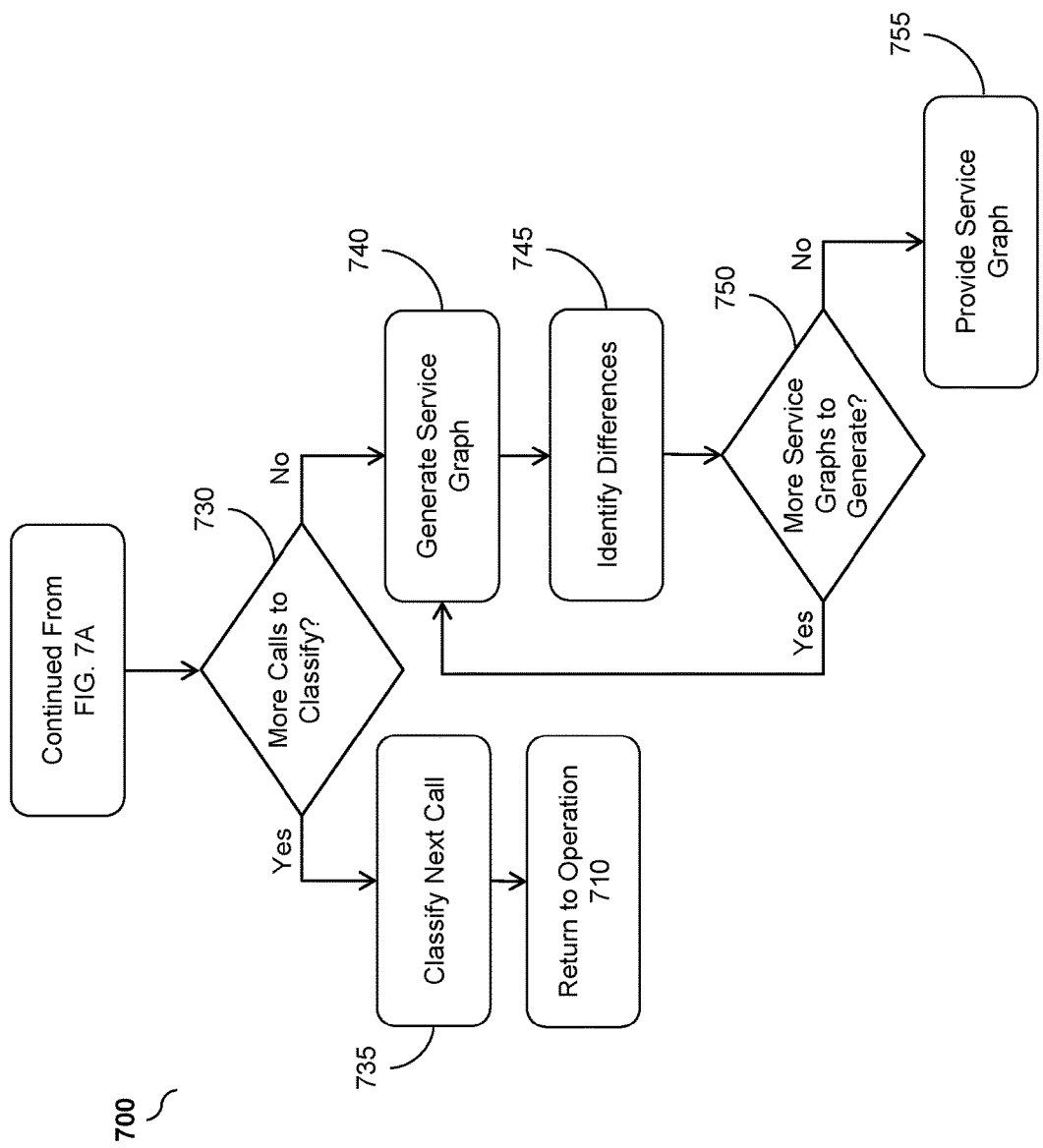

Referring now to FIGS. 7A-7B, depicted is a flow diagram of one embodiment of a method 700 for identifying a context of an endpoint 640 accessing a plurality of microservices 575. The functionalities of the method 700 may be implemented using, or performed by, the components detailed herein in connection with FIGS. 1-6.

Referring now to operation (705), and in some embodiments, a call 642 can be received. In embodiments, a device 602 intermediary to a plurality of endpoints 640 and a plurality of microservices 575, can receive a plurality of calls 642 to one or more of the plurality of microservices 575 originating from the plurality of endpoints 640 accessing the plurality of microservices 575. In some embodiments, the call manager 612 can receive a plurality of calls 642 to one or more of the plurality of microservices 575 originating from the plurality of endpoints 640 accessing the plurality of microservices 575.

At least one endpoint 640 can generate and/or transmit a call 642 to access at least one application, service or microservice 575 corresponding to an application or service. The endpoint 640 can transmit the call 642 to the device 602 to be forwarded to the respective microservice 575. In some embodiments, the device 602 can be a proxy or gateway. The device 602 can proxy the call from the endpoint 640 to at least one microservice 575 or a plurality of microservices 575. The call 642 can include a request for at least one service, execution of at least one service, at least one application and/or execution of at least one application. The call 642 can include a request for at least one microservice to perform a function or skill of at least one service or at least one application. For example, a service can include a collection or plurality of microservices 575. In embodiments, a service can include, be built and/or generated using one or more microservices 575 such that each of the one or more microservices 575 perform part of the function of the respective service. In some embodiments, an application can include a collection or plurality of microservices 575. In embodiments, an application can include, be built and/or generated using one or more microservices 575 such that each of the one or more microservices 575 perform part of the function of the respective application. The call 642 can identify at least one service 575, at least one microservice associated with at least one service, at least one application and/or at least one microservice 575 associated with the application. For example, a service can include a collection or plurality of microservices 575. In embodiments, a service can include, be built and/or generated using one or more microservices 575 such that each of the one or more microservices 575 perform part of the function of the respective service.

Referring now to operation (710), and in some embodiments, a context of an endpoint 640 can be determined or identified. In embodiments, the device 602 can identify, based at least on the plurality of calls 642, a context 622 for each of the endpoints 640 of the plurality of endpoints 640. In embodiments, the call manager 612 can identify, based at least on the plurality of calls 642, a context 622 for each of the endpoints 640 of the plurality of endpoints 640. The context 622 can include one of a type of device of the endpoint 640 communicating the respective call 642 or a type of application of the endpoint 640 communicating the respective call 642.

The device 602 can determine a context 622 for at least one endpoint 640 transmitting a call 642. The device 602 can determine a context 622 for a plurality of endpoints 640 transmitting a plurality of calls 642. The call manager 612 can determine a context 622 for at least one endpoint 640 transmitting a call 642. The call manager 612 can determine a context 622 for a plurality of endpoints 640 transmitting a plurality of calls 642. The context 622 can include or correspond to properties of the respective endpoint 640 or an application or program executing on the respective endpoint 640. For example, the endpoints 640 can include a client device, a computing device or a mobile device. The endpoints 640 can include, but not limited to, a browser (e.g., web browser), client application, a desktop device, a mobile device, and/or an Internet of Things (IoT) device. The type of device of the endpoint 640 can include a type of operating system of the device or metadata about the device or endpoint 640. The device 602 can determine that a context 622 of an endpoint 640 is at least one of a browser (e.g., web browser), client application, a desktop device, a device, a client device, a computing device, a mobile device, and/or an Internet of Things (IoT) device. The device 602 can determine an operating system or metadata of the respective endpoint 640.

In embodiments, the device 602 can use device parameters and/or device identifiers to determine the context 622 of an endpoint 640. The device 602 can use metadata received or determined for the endpoint 640 to determine the context of the respective endpoint 640. For example, in some embodiments, the device 602 can determine the context 622 of an endpoint 640 from data carried by a call 642 originating from the endpoint 640. The call 642 can include device parameters and/or device identifiers of the respective endpoint 640 transmitting the call 642. In embodiments, the device 602 can determine the context 622 of an endpoint 640 from one or more headers of a hypertext Transfer Protocol (HTTP) layer of a call 642 originating from the endpoint 640. The device 602 can transmit a request to the respective endpoint 640 for device parameters. In some embodiments, the device 602 can determine the device parameters of a respective endpoint 640 through at least one channel 660 to the respective endpoint 640. The device 602 can use the device parameters and/or device identifiers to determine the context of the endpoint 640.

Referring now to operation (715), and in some embodiments, a microservice 575 can be identified or determined. The device 602 can determine patterns that endpoints 640 of a specific type of device or specific type of context 622 access or attempt to access. In embodiments, the device 602 can identify, for each unique context 622, one or more microservices 575 of the plurality of microservices 575 accessed by the plurality of endpoints 640 having that unique context 622. The device 602 can determine a microservice 575 for each call 642. The device 602 can determine a plurality of microservices 575 for a plurality of calls 642. In embodiments, the device 602 can determine, based in part on a context 622 of the endpoints 640 transmitting the calls 642, the microservices 575 the respective endpoints 640 are accessing or attempting to access. For example, the device 602 can determine which endpoints 640 of specific context 622 are accessing or attempting to access which microservices 575. In some embodiments, the call manager 612 can determine patterns that endpoints 640 of a specific type of device or specific type of context 622 access or attempt to access. In embodiments, the call manager 612 can identify, for each unique context 622, one or more microservices 575 of the plurality of microservices 575 accessed by the plurality of endpoints 640 having that unique context 622. In embodiments, the call manager 612 can determine patterns that endpoints 640 of a specific type of device or specific type of context 622 access or attempt to access. In embodiments, the call manager 612 can identify, for each unique context 622, one or more microservices 575 of the plurality of microservices 575 accessed by the plurality of endpoints 640 having that unique context 622.

The device 602 can identify one or more endpoints 640 of the plurality of endpoints 640 having a first context 622 of a plurality of contexts 622 and identify the one or more microservices 575 of the plurality of microservices 575 accessed by the one or more endpoints 640 having the first context 622. For example, the device 602 can determine that one or more endpoints 640 of a first type of device or first type of context 622 generated one or more calls 642 for a first group of microservices 575. The device 602 can determine that one or more endpoints 640 of a second type of device or second type of context 622 generated one or more calls 642 for a second group of microservices 575. The number of groups of microservices 575 can vary and can include a single group or two or more groups based in part on the number of different types of devices and/or the number of different types of contexts 622. In some embodiments, a microservice 575 can be included in a single group or two more groups or classifications of microservices 575. For example, endpoints 640 of a first type of device or first type of context 622 and endpoints 640 of a second type of device or second type of context 622 can access or attempt to access the same microservice 575. Thus, one or more microservices 575 can be included in one or more different groups or classifications 624.

Referring now to operation (720), and in some embodiments, a call 642 can be forwarded. In embodiments, the device 602 can forward or transmit at least one call 642 to at least one microservice 575. The device 602 can forward or transmit a plurality of calls 642 to one or more of a plurality of microservices 575. In some embodiments, the call manager 612 can forward or transmit one or more calls 642 to one or more of a plurality of microservices 575. The device 602 can determine an intended microservice 575 for a call 642 and transmit the call 642 to the intended microservice 575. The device 602 can select at least one microservice 575 for a call 642 and transmit the call 642 to the selected microservice 575. In embodiments, the device 602 can forward or transmit the call 642 to a microservice 575 through at least one channel 660 established between the respective microservice 575 and the device 602. In some embodiments, the device 602 can be intermediary between the endpoints 640 and the microservices 575. For example, a call 642 can pass through or be transmitted from an endpoint 640 to one or more microservices 575 and the device 602 can identify context and other information of the call 642 as the call 642 is transmitted from the endpoint 640 to the one or more microservices 575. In embodiments, a call 642 can pass through or be transmitted from a first microservice 575 to one or more other microservices 575 and the device 602 can identify context and other information of the call 642 as the call 642 is transmitted from the microservice 575 to the one or more other microservices 575.

Referring now to operation (725), and in some embodiments, a call 642 can be classified. The device 602 can generate one or more classifications 624 for a plurality of calls 642 based in part on a context 622 of the one or more endpoints 640 generating or transmitting the calls 642. The device 602 can classify calls 642 (e.g., service calls) based on initial or original calls made by a type of device of an endpoint 640 or context of an endpoint 640 making the initial or original call. For example, the device 602 can group one or more calls 642 into a classification 624 using the context 622 of the endpoints 640 that generated the respective calls 642. In some embodiments, the device 602 can generate a first classification 624 for a first group (e.g., two or more) calls received from a first group of endpoints 640 having a first context 622 or corresponding to a first type of endpoint 640. The device 602 can generate a second classification 624 for a second group (e.g., two or more) calls received from a second group of endpoints 640 having a second context 622 or corresponding to a second type of endpoint 640. The device 602 can generate a third classification 624 for a third group (e.g., two or more) calls received from a third group of endpoints 640 having a third context 622 or corresponding to a third type of endpoint 640. The number of classifications 624 of calls 642 can vary. For example, in some embodiments, the device 602 can generate a single classification 624 of calls 642. In embodiments, the device 602 can generate two or more classifications 624 of calls 642.

Referring now to operation (730), and in some embodiments, a determination can be made whether more calls 642 need to be classified. For example, the device 602 can determine if each call 642 of the plurality of calls 642 has been classified. The device 602 can log and track each of the calls 642 received from one or more endpoints 640. The device 602 can compare the classified calls 642 to the log of calls 642 to determine if any call 642 of the plurality of calls 642 needs to be classified. The device 602 can, for each call 642, identify a context 622 of the end point 640 transmitting the call 642, identify at least one microservice 575 for the call 642 and classify the call 642, for example, as the respective call 642 is received at the device 602. In some embodiments, the device 602 can, for each call 642, identify a context 622 of the end point 640 transmitting the call 642, identify at least one microservice 575 for the call 642 and classify the call 642, for example, after a predetermined number of calls 642 are received at the device 602.

Referring now to operation (735), and in some embodiments, a determination can be made that one or more calls 642 needs to be classified. In some embodiments, the device 602 can, responsive to a comparison, determine that at least one call 642 needs to be classified. In embodiments, the device 602 can, responsive to receiving a new or subsequent call 642, determine that at least one call 642 needs to be classified. The device 602 can review the call 642 to determine data associated with the call 642. For example, the device 602 can determine metadata from the call 642 to determine device properties of an endpoint 640 that transmitted the call 642. The device 602 can use a header or a portion of the header to determine device properties of an endpoint 640 that transmitted the call 642. The device 602, responsive to determining call data for the respective call 642, can return to operation 710 to identify a context of the endpoint 640 that transmitted the respective call 642.

Referring now to operation (740), and in some embodiments, a determination can be made that each of the calls 642 have been classified. The device 602 can generate one or more service graphs 505. In embodiments, the device 602 can generate, based on at least one unique context 622, a service graph 505 to identify the one or more microservices 575 of the plurality of microservices 575 accessed by the plurality of endpoints 640 having that at least one unique context 622.

The device 602 can generate service graphs 505 (e.g., contextual service graphs) to distinguish similar and unique calls 642 that are made based on a context of the endpoints 640 generating the calls 642. The service graph 505 can be the same as or substantially similar to the service graphs 505 described above with respect to FIGS. 5A-5C. For example, the device 602 can generate the service graph 505 to include data representing the topology of a service 275 or a plurality of microservices 575 communicated with responsive to an initial or original call 642. In embodiments, the device 602 can use the service graphs 505 to identify the microservices 575 accessed by similar endpoints 640 or accessed by endpoints 640 of the same context 622. The device 602 can identify from the topology illustrated in the respective service graph 505, the microservices 575 accessed using the calls 642 or call data illustrated or provided in the respective service graph 505. The device 602 can identify patterns from the service graph 505 to determine which microservices 575 endpoints 640 of the same context typically call or attempt to call.

The device 602 can generate the service graph 505 to include data representing the topology of a service 275 or a plurality of microservices 575 communicated with by one or more endpoints 640 having the same context 622 or corresponding to the same type of device or type of application. The device 602 can generate a first service graph 505 for a first plurality of calls 642 generated by a first one or more endpoints 640 having a first context 622. The device 602 can generate a second service graph 505 for a second plurality of calls 642 generated by a second one or more endpoints 640 having a second context 622. The device 602 can generate a third service graph 505 for a third plurality of calls 642 generated by a third one or more endpoints 640 having a third context 622. The number of service graphs 505 can vary. For example, in some embodiments, the device 602 can generate a single service graph 505 corresponding to a plurality of endpoints 640 of a particular context 622. In embodiments, the device 602 can generate two or more service graphs 505 corresponding to multiple pluralities or groupings of endpoints 640 of two or more contexts 622.

In some embodiments, the service graphs 505 can show or illustrate one or more dependencies 628 between two or more microservices 575. The device 602 can determine a dependency 628 based in part on an order of calls 642 made or communicated between two or more microservices 575 responsive to an initial or original call 642. For example, the service graph 505 can identify an order in which one or more microservices 575 can work together, be grouped together or collectively respond to one or more calls 642. The dependency can include a reliance of at least one microservice 575 to use the functionality, skill or services of at least one other microservice 575 to handle or execute a call 642. In one embodiment, a group of microservices 575 collectively can correspond to or be associated with the functionality of at least one service or application or at least one service. The different microservices 575 of the group of microservices 575 can be dependent on each other or at least one microservice 575 in the respective group (e.g., have a dependency) to handle or execute a call 642 to perform the full functionality, skill or services of at least one service or application. The device 602, using the service graph 505, can determine which microservices 575 a first microservice 575 is linked with or dependent on. The service graph 505 can include or identify multiple dependencies 628. The device 602 can determine the multiple dependencies 628 included with or identified by the service graph 505 and each of the microservices 575 associated with the multiple dependencies 628.

Referring now to operation (745), and in some embodiments, differences between different service graphs 505 can be determined. In embodiments, the device 602 can generate a plurality of services graphs 505 for a plurality of unique contexts 622 and display the plurality of graphs to identify one of differences or similarities in one or more microservices 575 accessed by the plurality of endpoints 640. The device 602 can compare service graphs 505 to determine patterns based in part on a context 622 of the endpoints 640 that generated the respective calls 642 associated with the respective service graph 505. The device 602 can distinguish similar and unique calls 642 that are made based on a context of the endpoints 640 generating the calls 642. The service graphs 505 can show patterns in which endpoints 640 of a first context 622 call or attempt to call a first group of microservices 575 and a second context 622 call or attempt to call a second group of microservices 575. The second group of microservices 575 can be different from the first group of microservices 575. In some embodiments, the second group of microservices 575 can have one or more microservices 575 in common with the first group of microservices 575.

The device 602 can determine statistics for a service graph 505. The statistics can include, but not limited to, historical data corresponding to the service graph 505, a context 622 associated with the service graph 505, endpoints associated with the service graph 505, microservices 575 associated with the service graph 505, and dependencies 628 associated with the service graph 505. The statistics can include, but not limited to, call count, call times, failure rates, and/or success rates. In embodiments, the device 602 can monitor the plurality of microservices 575 associated with a plurality of calls 642 to determine the statistics for a service graph 505. The device 602 can continually monitor the plurality of microservices 575 during communication of one or more calls 642 associated with a service graph 505 to determine the statistics for the respective service graph 505.

Referring now to operation (750), and in some embodiments, a determination can be made whether more service graphs 505 need to be generated. For example, the device 602 can determine if a service graph 505 has been generated for each context 622 identified from the plurality of calls 642. The device 602 can log and track the identified contexts 622 of each of the endpoints 640 that generated the plurality of calls 642. The device 602 can compare the identified contexts 622 to the number of service graphs 505 generated to determine if a service graph 505 has been generated for each context 622 identified from the plurality of calls 642.

If the device 6020 determines that one or more service graphs 505 need to be generated, the device 602 can return to operation 740 and generate one or more service graphs 505. Referring now to operation (755), and in some embodiments, if the device 6020 determines that a service graph 505 has been generated for each of the contexts 622, the device 602 can provide one or more service graphs 505 to at least one endpoint 640. The device 602 can transmit or forward at least one service graph to at least one endpoint 640 or at least one application (e.g., client application) executing on at least one endpoint 640. The device 602 can transmit or forward a plurality of service graphs to a plurality of endpoints 640 or a plurality of applications (e.g., client application) executing on a plurality of endpoints 640.

The device 602 can display the service graph 505 on at least one endpoint 640. In some embodiments, the device 602 can provide for display a service graph 505 on at least one endpoint 640 using method 580 described above with respect to FIG. 5C. For example, in embodiments, the device 602 can provide a service graph display (e.g., service graph display 514 of FIGS. 5A-5C) that can include any graphical or electronic representation of a service graph 505 for rendering or display on any type and form of display device. The service graph display may include any type and form of user interface elements to allow users to interact, interface or manipulate a service graph 505. Portion of the service graph display may be selectable to identify information, such as metrics or topology information about that portion of the service graph 505. Portions of the service graph display may provide user interface elements for users to take an action with respect to the service graph or portion thereof, such as to modify a configuration or parameter of the element. The device 602 can display the service graph 505 on at least one endpoint 640 to identify the unique context 622 associated with the respective service graph 505 and the one or more microservices 575 called by the one or more endpoints 640 having the unique context 622. In embodiments, the device 602 can provide a service graph 505 for display on an endpoint 640 through a client application executing on the respective endpoint 640.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A method for identifying a context of an endpoint accessing a plurality of microservices, the method comprising:
   (a) receiving, by a device intermediary to a plurality of endpoints and a plurality of microservices, a plurality of calls to access one or more of the plurality of microservices, the microservices to perform a function or skill of at least one service or at least one application;
   (b) identifying, by the device, a context for each of the endpoints of the plurality of endpoints based on an original call for a microservice from that endpoint, the context comprising one of a type of device of the endpoint or a type of application of the endpoint communicating the call;
   (c) identifying, by the device, for each unique context, one or more microservices of the plurality of microservices with that unique context; and
   (d) generating, by the device based on at least one unique context, a service graph to identify at least one microservice of the plurality of microservices to respond to the received plurality of calls.

2. The method of claim 1, wherein (a) further comprising forwarding, by the device, the plurality of calls to the one or more of the plurality of microservices.

3. The method of claim 1, wherein (b) further comprising determining the context of an endpoint from data carried by a call originating from the endpoint.

4. The method of claim 1, wherein (b) further comprising determining the context of an endpoint from one or more headers of a hypertext Transfer Protocol (HTTP) layer of a call originating from the endpoint.

5. The method of claim 1, wherein the type of device comprises one of a desktop device, a mobile device or an Internet of Things (IoT) device.

6. The method of claim 1, wherein the type of device comprises one of type of operating system of the device or metadata about the device.

7. The method of claim 1, wherein the type of application comprises one of a browser, a client application or a mobile application.

8. The method of claim 1, wherein (c) further comprises identifying one or more endpoints of the plurality of endpoints having a first context of a plurality of contexts and identifying the one or more microservices of the plurality of microservices accessed by the one or more endpoints having the first context.

9. The method of claim 1, wherein (d) further comprises displaying, by the device, the service graph to identify the unique context and the one or more microservices called by the one or more endpoints having the unique context.

10. The method of claim 1, wherein (d) further comprises generating, by the device, a plurality of services graphs for a plurality of unique contexts and displaying the plurality of graphs to identify one of differences or similarities in one or more microservices accessed by the plurality of endpoints.

11. A system for identifying a context of an endpoint accessing a plurality of microservices, the system comprising:
 a device comprising one or more processors, coupled to memory and intermediary to a plurality of endpoints and a plurality of microservices, the device configured to:
  receive a plurality of calls to access one or more of the plurality of microservices, the microservices to perform a function or skill of at least one service or at least one application;
  identify, a context for each of the endpoints of the plurality of endpoints based on an original call for a microservice from that endpoint, wherein the context comprises one of a type of device of the endpoint or a type of application of the endpoint communicating the call;
  wherein the device is configured to identify for each unique context one or more microservices of the plurality of microservices with that unique context; and
  generate, based on at least one unique context, a service graph to identify at least one microservice of the plurality of microservices to respond to the received plurality of calls.

12. The system of claim 11, wherein the device is further configured to forward the plurality of calls to the one or more of the plurality of microservices.

13. The system of claim 11, wherein the device is further configured to determine the context of an endpoint from data carried by a call originating from the endpoint.

14. The system of claim 11, wherein the device is further configured to determine the context of an endpoint from one or more headers of a hypertext Transfer Protocol (HTTP) layer of a call originating from the endpoint.

15. The system of claim 11, wherein the type of device comprises one of a desktop device, a mobile device or an Internet of Things (IoT) device.

16. The system of claim 11, wherein the type of device comprises one of type of operating system of the device or metadata about the device.

17. The system of claim 11, wherein the type of application comprises one of a browser, a client application or a mobile application.

18. The system of claim 11, wherein the device is further configured to identify one or more endpoints of the plurality of endpoints having a first context of a plurality of contexts and identifying the one or more microservices of the plurality of microservices accessed by the one or more endpoints having the first context.

19. The system of claim 11, wherein the device is further configured to display the service graph to identify the unique context and the one or more microservices called by the one or more endpoints having the unique context.

20. The system of claim 11, wherein the device is further configured to generate a plurality of services graphs for a plurality of unique contexts and displaying the plurality of graphs to identify one of differences or similarities in one or more microservices accessed by the plurality of endpoints.

* * * * *